J. G. CAPSTAFF.
COLOR PHOTOGRAPHY.
APPLICATION FILED FEB. 14, 1918.

1,315,464.

Patented Sept. 9, 1919.

WITNESSES:
Donald H. Stewart
Helen M. Fraser

INVENTOR,
John G. Capstaff,
BY R. L. Stinchfield
Newton N. Perrins
ATTORNEYS

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

COLOR PHOTOGRAPHY.

1,315,464.   Specification of Letters Patent.   Patented Sept. 9, 1919.

Application filed February 14, 1918. Serial No. 217,171.

*To all whom it may concern:*

Be it known that I, JOHN G. CAPSTAFF, a subject of the King of Great Britain, residing at Rochester, in the county of Monroe and State of New York, have invented certain new and useful Improvements in Color Photography, of which the following is a full, clear, and exact specification.

My present invention relates to photography and more particularly to the production of photographs in color, and it has for its object to provide a simple and convenient method of making photographic transparencies in two or more colors, which method may be successfully practised without the use of special apparatus or an especially prepared sensitized medium. My invention also includes a process for making photographic reproductions, such as a transparency or a print in any desired monochrome, and a process of preparing a photographic image for a dyeing process.

I have discovered that certain materials, if used as a bath for a gelatin film containing a silver photographic image, so affect the gelatin that it is softer, more soluble and more permeable to dye immediately adjacent those points where particles of silver had been than at other points; and harder and more resistant to dye at the points near which there had been no silver image. I make use of this discovery in submitting films to a bath having such properties as a step preparatory to a dyeing process, as, for instance, in multi-color photography and in the making of a monochromatic photographic image. I have here set forth some examples of the ways in which such a step may be employed.

By way of example of its use I will first explain completely the making of a two color photograph by a process including the use of a bath having the effect noted.

To make the steps of such a process clearer, I have shown in the accompanying drawings diagrammatic views illustrating roughly the method of making a picture of a colored object containing only two colors, red and green, and also white and black areas, and have indicated by the conventional shading and by words the coloring or lack of color the respective parts are given or assume after the treatment indicated.

Figure 1:
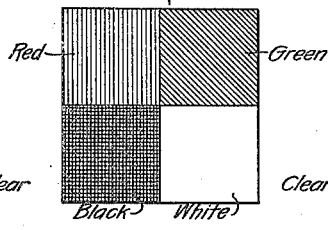
Figure 2:
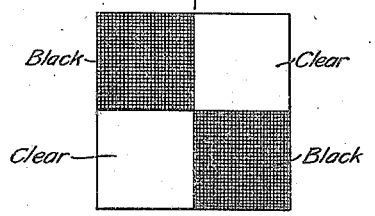
Figure 3:
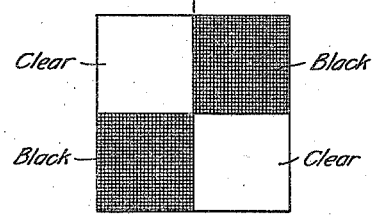
Figure 4:
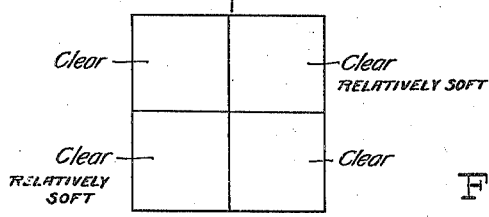

Figure 1 indicates an object,

Fig. 2 a developed negative that has been exposed through a red filter,

Fig. 3 a diagram of a developed positive printed from the same negative,

Fig. 4 a diagram of a positive after bleaching and fixing,

Figure 6:
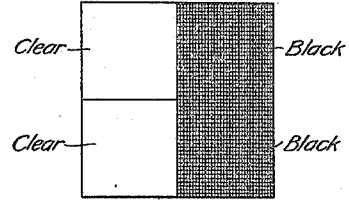
Figures 5, 10:
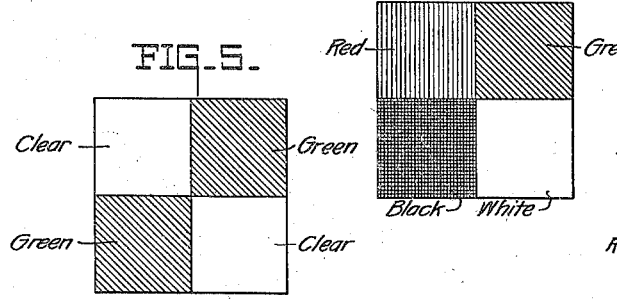

Fig. 5 a diagram of the same after dyeing in a green bath,

Fig. 6 a diagram of a developed negative made from the object shown in Fig. 1, made through the green filter,

Figure 7:
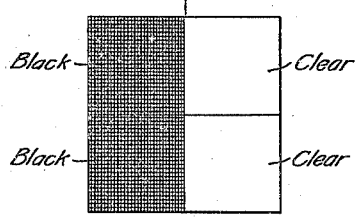
Figure 8:
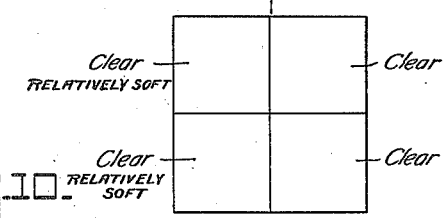
Figure 9:
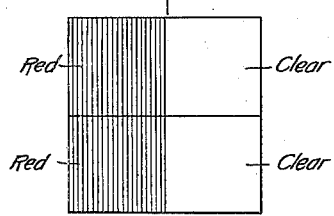

Fig. 7 a developed positive made from the negative shown in Fig. 6,

Fig. 8 the positive shown in Fig. 7 after having been bleached and fixed,

Fig. 9 the same after having been dyed in a red bath, and

Fig. 10 a diagram of the composite image when the positives shown in Figs. 5 and 9 are superposed and viewed by transmitted light.

In practising my invention in the making of a color photograph, I first obtain upon a sensitive film two negatives of the subject to be reproduced, the sensitive body being composed of a suitable sensitive salt such as panchromatic silver bromo-iodid suspended in a suitable vehicle such as gelatin, hereinafter termed sensitized gelatin film. This may be done by simultaneous or successive exposures through the same lens or through two lenses very close one to the other, this form of apparatus being now customarily used for taking color photographs. By "film" I mean the word in its original sense; that is, a colloid such as gelatin in which is suspended a light sensitive salt, the gelatin being mounted on any suitable base or support. One negative is made mainly by the green light reflected by the subject and the other mainly by the red light, preferably through the use of red and green filters applied to the lens or lenses. If it is desired to make a number of positives, the two negatives are developed, fixed and washed, as usual. From these negatives positives are printed in the usual manner, and these positives are developed and, with or without fixing, are washed and submitted to a bleaching and softening bath which converts the free silver into a salt of silver, which is subsequently removed in the hypo bath and leaves the film practically clear, transparent and almost colorless except for a faint trace of the original image. One bleaching solution that has been successfully used is:

| | | |
|---|---|---|
| Ferric chlorid | _____ | 10 grams. |
| Tartaric acid | _____ | 3 grams. |
| Water | _____ | 100 grams. |

The bath may be applied at ordinary temperatures, and the solution washed back and forth across the film by rocking the tray, as is usual in photographic manipulations, until the results mentioned are obtained.

Besides the conversion of the silver into its salt the bleaching step has a peculiar effect, in that it leaves the gelatin immediately adjacent each silver particle attacked softer than the other parts, so that what were the black portions of the positive film are relatively soft, while what were the light portions of the positive and lacked free silver become hardened. The softer gelatin is more readily soluble in hot water and is also much more pervious to dye than the harder gelatin substantially in proportion to the amount of silver originally present.

After undergoing this bleaching process, the positives are fixed in the usual hypo bath and are very thoroughly dried. I have at this step a positive film which is softer at points corresponding to those points in the negative upon which light did not fall than at other points. The positives constitute, therefore, a record prepared by the action of differently colored lights, since they are records taken directly from the negatives which were exposed through the color filters or screens.

The positive films are now dyed. An acid dye (preferably a salt of a sulfonic acid) is used and in the two-color method being followed two baths are provided, one an orange red and the other blue green. The red sensation record, that is, the positive film printed from the negative which was exposed through the red filter, is, by submersion, dyed green, while the green sensation record is similarly dyed red. The distribution of the silver particles and hence of the softer portions on the two films is diversified according to the different color values they respectively record, and hence the dye takes effect partly at the same and partly at different relative points. After having been dyed, the positive films may be rinsed again in water to remove the superfluous dye and quickly dried with the aid of preliminary blotting or squeegeed to prevent lateral diffusion of the dye and the resulting lack of good definition, but preferably they are treated with dilute acid or aluminum chlorid which fixes the dye with even better results.

At this stage I have two monochromatic photographic records of the subject in different colors. It is to be noted that whether or not the original negative had been exposed through a color filter, I can choose any color of dye I desire to make a monochromatic element or photograph to be viewed by transmitted or reflected light. Using the method as above outlined and the making of such a monochromatic record, I consider as within the scope of my invention.

Having obtained the two dyed complementary monochromatic films I superpose these with the images in exact registry and the combination is viewed by transmitted light.

It will be seen in Fig. 2 that, since the red filter absorbs green light, all green portions in the original subject produce little or no effect on the sensitive film emulsion; hence, only those portions upon which red light fell show a silver image, and, consequently, the positive shown in Fig. 3 made from this negative has the clear portions only at points corresponding to those upon which red light fell in the original exposure. Similarly, since the green filter absorbs red light, all red portions of the original subject produce little or no effect upon the negative shown in Fig. 6, and in the positive shown in Fig. 7 only those portions are clear upon which the green light fell. When these two positives were bleached only those portions were rendered relatively soft which correspond to those portions in the original negatives upon which the light fell, and these portions, being more pervious to dye than the unaffected portions, were the most deeply dyed. Accordingly, we have in Fig. 5 those portions of the positive film dyed green which correspond to those portions of the original negative upon which no light impression was made, and in Fig. 9 we have those portions of the positive dyed red which correspond to the original negative upon which no light impression was made. When these two dyed films are superposed with the images in exact registry, it will be seen that a clear space in Fig. 5 and a red space in Fig. 9 are superposed giving by transmitted light a red image; that the green space in Fig. 5 and a clear space in Fig. 9 being superposed give a green image; that a green space in Fig. 5 and a red space in Fig. 9 are superposed giving a black image and that clear spaces in both positives being superposed give a clear image, and that these color values represent correctly the color values of the original object.

If it is desired to make but one photograph in color, the negatives originally exposed through the color screens may be developed and washed, as usual, and submitted to the bleaching bath already described, with the effect in this case that the gelatin is rendered relatively soft at the points where light fell upon the films. Advantage is now taken of that property already referred to, that the softer gelatin is more soluble. The negatives are washed in hot water, and the softer gelatin dissolved, leaving on the film a relief of the harder gelatin, the portions in relief being those portions of the film upon which light had not fallen. The extent of the relief in any area will be inverse to the extent to which light had fallen thereon. The negatives may be fixed before or after the hot water bath. After being dried, the negatives are dyed in such a way that the dye adheres to the portions in relief. There is thus produced a positive dyed image of the subject photographed. The color of the dye selected is substantially complementary to the color of the filter through which the negative was exposed. For the illustration of the steps of this method, Fig. 1 shows the object, Figs. 2 and 6 the color selection negatives taken through red and green filters respectively, Fig. 5 the negative taken through the red filter after having been bleached and dyed into a green positive, Fig. 9 the negative taken through the green filter, bleached and dyed into a red positive, and Fig. 10 the dyed positives shown in Figs. 5 and 9 superposed.

It is, of course, apparent that by this process a negative could be made with or without the use of a color filter and by the use of a selected dye a single monochromatic photographic record could be obtained which may be viewed by transmitted or reflected light. Moreover, a master positive could be made from the two color selection negatives from which negatives could be produced and color photographs made by this process.

It is to be noted that in each of the processes already outlined there are four main steps: The making of a photographic image, either negative or positive; bleaching and softening the film; a dyeing process and the superposition of the color positives.

I have also obtained successful results in using the following solution as the bleaching bath:

4% potassium permanganate_ 1 part.
20% sulfuric acid_____ 1 part.
Water _____ 20 parts.

I have, moreover, successfully used a potassium permanganate solution without the acid—that is, a neutral bath.

In any of the steps the films may be fixed after the usual development, if desired, and before the bleaching, but fixing at this time would be unnecessary for the reason that the bleaching solution in dissolving the silver re-precipitates it and forms a silver salt, and fixing must, therefore, follow the bleaching anyway, while it is immaterial to the action of the bleach whether the developed film has been previously fixed or not.

Where a third color is desired a tri-color process is worked in the same way, a third color sensation image being produced, bleached and suitably dyed and the dyed image superimposed upon the other two. Preferably the gelatin film of this third component is stripped from its support, so as not to produce too great a separation of the images. A practical advantage in this method of making positives is that I can obtain as many positives as may be desired from a single set of negatives and do not have to make a master positive from the negatives. The loss of quality due to making master positives is avoided and the expense and bother of such positives are avoided. Moreover, the dye does not have to permeate a hardened upper layer, but acts immediately upon the most pervious portions of the gelatin, giving better tone rendering.

Having thus described my invention, what I claim as new and desire to secure by Letters Patent is:

1. The method of preparing for a dyeing operation a film in which is a photographic image, which method consists in bleaching the image and rendering the film differentially soft according to the light gradation it has recorded, the softer portions of the film being immediately adjacent the light affected portions of the image.

2. The method of preparing for a dyeing operation a gelatin light-sensitive film, which contains a photographic image, which consists in bleaching the silver image and rendering the gelatin differentially permeable to dye, according to the light gradations recorded in the film, the more permeable portions being immediately adjacent the light affected portions of the image.

3. The method of preparing for a dyeing operation a gelatin light-sensitive film, containing a photographic image, which consists in bleaching the silver image and rendering the gelatin differentially soft, soluble and permeable to dye, according to the light gradations recorded in the film, the portions that are the more soft, soluble and permeable to dye being immediately adjacent the light affected portions of the image 4. The method of preparing for a dyeing operation a sliver photographic image in a gelatin light-sensitive film, which consists in reducing the silver of the image to a silver salt and rendering the gelatin differentially soft according to the light gradations recorded in the film, the softer portions being immediately adjacent the particles of the silver image.

5. The method of preparing for a dyeing operation a gelatin light-sensitive film containing a silver photographic image which consists in submitting the film to a bath that converts the silver to a salt and that renders the gelatin differentially permeable to dye according to the recorded light gradations, the more permeable portions being immediately adjacent the silver particles of the image.

6. The method of preparing for a dyeing operation a gelatin light-sensitive film in which is a silver photographic image which consists in submitting the film to a bath that converts the silver into a soluble salt and that renders the gelatin in the immediate vicinity of each particle of silver relatively softer than the gelatin at other points and in fixing the film to remove the soluble salts.

7. The method of making a monochromatic photograph, which consists in preparing a photographic image on a film, bleaching and rendering the film differentially soft according to the light gradations it has recorded, the softer portions being immediately adjacent the light affected portions of the image, and subjecting the same to a dyeing operation.

8. The method of making a monochromatic photograph of a subject which consists in preparing a silver photographic image of the subject in a gelatin light- sensitive film, bleaching the silver image and rendering the film differentially soft according to the light gradations it has recorded, the softer portions being immediately adjacent the silver particles of the image, and subjecting the film to a dyeing operation.

9. The method of making a monochromatic photograph of a subject, which consists in preparing a silver photographic image of the subject in a gelatin light-sensitive film, submitting the film to a bath that converts the silver into a soluble salt and that renders the gelatin in the immediate vicinity of each particle of silver relatively softer, more soluble and more permeable to dye than the gelatin at other points, fixing the film to remove the soluble salts and subjecting the film to a dyeing operation.

10. The method of making photographs in color which consists in preparing a plurality of color selection photographic images on films, bleaching and rendering each film differentially soft according to the light gradations it has recorded, the softer portion being immediately adjacent the light affected portions of the image, subjecting the films to a dyeing process whereby they are dyed different colors and superposing the films with the images in register.

11. The method of making photographs in color which consists in preparing two photographic positive images of a subject on gelatin light-sensitive films by the action of differently colored lights, said images being otherwise duplicates, bleaching and rendering each film differentially soft, soluble and permeable to dye according to the light gradations it has recorded, the softer portions being immediately adjacent the light affected portions of the image, subjecting each of the two films to the action of a different dye, said films having been fixed at some stage after the bleaching, and superposing the films with the images in register.

12. The method of making color photographs which consists in preparing a plurality of color selection photographic positive silver images in films, submitting the films to a bath that converts the silver into a soluble salt and which renders the film immediately adjacent each silver particle softer than other portions, removing the soluble salts, dyeing the softer portions of the films different colors appropriate to their respective color values, and placing the films in superposed registering relationship.

13. The method of making photographic reproductions in color, which consists in preparing a plurality of color selection photographic positive silver images of a subject in gelatin light-sensitive films, said images being otherwise duplicates, submitting the films to a bath which converts the silver into a soluble salt and which renders the gelatin immediately adjacent each silver particle softer than other portions thereof, fixing the films to remove the soluble salts, drying the films, dyeing the softer portions of the films different colors appropriate to their respective color values, and finally placing them in superposed registering relationship.

14. The method of making photographic reproductions in color, which consists in preparing two photographic positive silver images of a subject in gelatin light-sensitive films by the action of differently colored lights, said images being otherwise duplicates, submitting the films to a bath which converts the silver into a soluble salt and which renders the gelatin immediately adjacent each silver particle more permeable to dye than other portions thereof, fixing the films to remove the soluble salts, drying the films, dyeing the more permeable portions of the films different colors appropriate to their respective color values, fixing the color in the dyed film against diffusion and finally placing them in superposed registering relationship.

Signed at Rochester, New York, this 7th day of February, 1918.

JOHN G. CAPSTAFF.